US 7,748,532 B2
Jul. 6, 2010

(12) United States Patent
Buitron et al.

(54) CASSETTE FOR HOLDING DISKS OF DIFFERENT DIAMETERS

(75) Inventors: Gerardo Buitron, San Jose, CA (US); Walter Crofton, Castro Valley, CA (US); David Newman, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 2056 days.

(21) Appl. No.: 10/435,227

(22) Filed: May 9, 2003

(65) Prior Publication Data

US 2004/0069662 A1    Apr. 15, 2004

Related U.S. Application Data

(60) Provisional application No. 60/417,630, filed on Oct. 10, 2002.

(51) Int. Cl.
| B65D 85/30 | (2006.01) |
| A47G 19/08 | (2006.01) |
| B05C 13/02 | (2006.01) |

(52) U.S. Cl. .................. 206/454; 118/500; 206/711; 211/41.18

(58) Field of Classification Search ............. 206/445, 206/454, 710, 711; 211/41.18; 118/500
See application file for complete search history.

(56) References Cited

U.S. PATENT DOCUMENTS

| 3,382,647 | A |   | 5/1968 | Davey et al. |
| 3,505,777 | A |   | 4/1970 | Tsutsumi |
| 3,949,891 | A | * | 4/1976 | Butler et al. ................. 118/500 |
| 4,573,851 | A |   | 3/1986 | Butler |
| 4,676,008 | A |   | 6/1987 | Armstrong |
| 4,694,778 | A |   | 9/1987 | Learn et al. |
| 4,695,217 | A |   | 9/1987 | Lau |
| 4,768,328 | A |   | 9/1988 | Mims |
| 4,808,456 | A |   | 2/1989 | Yamada et al. |
| 4,819,579 | A |   | 4/1989 | Jenkins |
| 4,840,530 | A |   | 6/1989 | Nguyen |
| 4,856,957 | A |   | 8/1989 | Lau et al. |
| 4,858,764 | A | * | 8/1989 | Domokos ................. 206/454 |

(Continued)

FOREIGN PATENT DOCUMENTS

EP    0 177 073    8/1985

(Continued)

OTHER PUBLICATIONS

"Design of an active memory system for network applications"; Asthana, A.; Cravatts, M.; Krzyzanowski, P.; Memory Technology, Design and Testing, Aug. 8-9, 1994; p. 58-63.

(Continued)

*Primary Examiner*—Byron P Gehman
(74) *Attorney, Agent, or Firm*—McCarthy Law Group

(57) ABSTRACT

Various apparatus and methods are provided for positioning and handling hard memory disks. A disk carrier is provided with adjustably positionable side wall inserts. The inserts or panels may be moved between a plurality of positions to accommodate disks of different diameters. The inserts may also be substituted to accommodate disks of different thickness or different orientations, such as pairs of disks in gap merge orientation or contact merge orientation.

23 Claims, 5 Drawing Sheets

U.S. PATENT DOCUMENTS

| | | |
|---|---|---|
| 4,939,891 A | 7/1990 | Podini |
| 4,947,624 A | 8/1990 | Cones, Sr. et al. |
| 4,947,784 A | 8/1990 | Nishi |
| 4,958,982 A | 9/1990 | Champet et al. |
| 4,962,879 A | 10/1990 | Goesele et al. |
| 4,981,222 A | 1/1991 | Lee |
| 4,987,407 A | 1/1991 | Lee |
| 5,007,788 A | 4/1991 | Asano et al. |
| 5,111,936 A | 5/1992 | Kos |
| 5,125,784 A | 6/1992 | Asano |
| 5,188,499 A | 2/1993 | Tarng et al. |
| 5,250,339 A | 10/1993 | Tani et al. |
| 5,269,643 A | 12/1993 | Kodama et al. |
| 5,314,107 A | 5/1994 | D'Aragona et al. |
| 5,351,156 A | 9/1994 | Gregory et al. |
| 5,430,992 A | 7/1995 | Olson |
| 5,478,622 A | 12/1995 | Nakamura et al. |
| 5,480,695 A | 1/1996 | Tenhover et al. |
| 5,486,134 A | 1/1996 | Jones et al. |
| 5,497,085 A | 3/1996 | Tian et al. |
| 5,501,568 A | 3/1996 | Ono |
| 5,612,830 A | 3/1997 | Gregory et al. |
| 5,620,295 A | 4/1997 | Nishi |
| 5,664,407 A | 9/1997 | Cooper, III et al. |
| 5,665,478 A | 9/1997 | Suzuki et al. |
| 5,773,124 A | 6/1998 | Ishikawa et al. |
| 5,820,449 A | 10/1998 | Clover |
| 5,906,469 A | 5/1999 | Oka et al. |
| 5,926,352 A | 7/1999 | Murayama et al. |
| 5,928,759 A | 7/1999 | Arita et al. |
| 5,956,317 A | 9/1999 | Komiyama et al. |
| 5,960,960 A * | 10/1999 | Yamamoto .................. 206/711 |
| 5,976,255 A | 11/1999 | Takaki et al. |
| 5,991,104 A | 11/1999 | Bonyhard |
| 6,007,896 A | 12/1999 | Bhushan |
| 6,033,486 A | 3/2000 | Andros |
| 6,033,522 A | 3/2000 | Iwata et al. |
| 6,039,186 A * | 3/2000 | Bhatt et al. .................. 206/711 |
| 6,086,961 A | 7/2000 | Bonyhard |
| 6,107,599 A | 8/2000 | Baumgart et al. |
| 6,117,570 A | 9/2000 | Chen et al. |
| 6,120,890 A | 9/2000 | Chen et al. |
| 6,150,015 A | 11/2000 | Bertero et al. |
| 6,158,596 A * | 12/2000 | Ohtsuka et al. ............. 118/500 |
| 6,182,814 B1 | 2/2001 | Koehler |
| 6,230,891 B1 | 5/2001 | Usui et al. |
| 6,345,947 B1 | 2/2002 | Egashira |
| 6,354,794 B2 | 3/2002 | Sato et al. |
| 6,368,040 B1 | 4/2002 | Yamasaki et al. |
| 6,427,850 B2 | 8/2002 | Mendiola |
| 6,457,929 B2 | 10/2002 | Sato et al. |
| 6,498,086 B1 | 12/2002 | Zheng |
| 6,582,279 B1 | 6/2003 | Fox et al. |
| 6,595,028 B1 | 7/2003 | Miyamoto et al. |
| 6,596,083 B2 | 7/2003 | Cromwell et al. |
| 6,612,801 B1 | 9/2003 | Koguchi |
| 6,625,835 B1 | 9/2003 | Frost et al. |
| 6,626,744 B1 | 9/2003 | White et al. |
| 6,664,503 B1 | 12/2003 | Hsieh et al. |
| 6,758,339 B2 * | 7/2004 | Simpson et al. ............. 206/710 |
| 6,769,855 B2 | 8/2004 | Yokomori et al. |
| 6,818,331 B2 | 11/2004 | Sakawaki et al. |
| 6,821,653 B2 | 11/2004 | Fukushima et al. |
| 6,874,638 B2 * | 4/2005 | Iijima et al. ................. 206/711 |
| 6,926,977 B2 | 8/2005 | Osawa et al. |
| 6,942,933 B2 | 9/2005 | Osawa |
| 7,027,246 B2 | 4/2006 | Valeri |
| 7,163,110 B2 * | 1/2007 | Huang et al. ............. 211/41.18 |
| 7,246,708 B2 * | 7/2007 | Chuang et al. ........... 211/41.18 |
| 2001/0049031 A1 | 12/2001 | Bajorek et al. |
| 2001/0053444 A1 | 12/2001 | Yokoyama et al. |
| 2002/0006324 A1 | 1/2002 | Sato et al. |
| 2002/0054976 A1 | 5/2002 | Nakamura et al. |
| 2002/0055017 A1 | 5/2002 | Fukushima et al. |
| 2002/0081181 A1 | 6/2002 | Yokomori et al. |
| 2002/0132043 A1 | 9/2002 | Cromwell et al. |
| 2002/0142707 A1 | 10/2002 | Shimada et al. |
| 2002/0159177 A1 | 10/2002 | Aoki et al. |
| 2003/0082407 A1 | 5/2003 | Sakawaki et al. |
| 2003/0104253 A1 | 6/2003 | Osawa et al. |
| 2003/0179692 A1 | 9/2003 | Ohotomo |
| 2003/0194464 A1 | 10/2003 | Iida et al. |
| 2003/0208899 A1 | 11/2003 | Grow et al. |
| 2003/0209389 A1 | 11/2003 | Buitron et al. |
| 2003/0209421 A1 | 11/2003 | Buitron et al. |
| 2003/0210498 A1 | 11/2003 | Kim et al. |
| 2003/0211275 A1 | 11/2003 | Buitron et al. |
| 2003/0211361 A1 | 11/2003 | Kim et al. |
| 2004/0005481 A1 | 1/2004 | Osawa |
| 2004/0013011 A1 | 1/2004 | Valeri |
| 2004/0016214 A1 | 1/2004 | Buitron |
| 2004/0023074 A1 | 2/2004 | Shimizu et al. |
| 2004/0035737 A1 | 2/2004 | Buitron et al. |
| 2004/0037005 A1 | 2/2004 | Osawa |
| 2004/0068862 A1 | 4/2004 | Buitron et al. |
| 2004/0070092 A1 | 4/2004 | Buitron et al. |
| 2004/0070859 A1 | 4/2004 | Crofton et al. |
| 2004/0071535 A1 | 4/2004 | Crofton et al. |
| 2004/0072029 A1 | 4/2004 | Lowery et al. |
| 2004/0170870 A1 | 9/2004 | Yokoyama et al. |
| 2005/0003106 A1 | 1/2005 | Isozaki |
| 2005/0037140 A1 | 2/2005 | Sakawaki et al. |
| 2005/0121839 A1 | 6/2005 | Fukushima et al. |
| 2005/0132958 A1 | 6/2005 | Leng et al. |

FOREIGN PATENT DOCUMENTS

| | | |
|---|---|---|
| EP | 0 192 244 | 2/1986 |
| EP | 768704 | 4/1997 |
| JP | 63122527 A | 5/1988 |
| JP | 04067333 A | 3/1992 |
| JP | 05028533 A | 2/1993 |
| JP | 06076384 A | 3/1994 |
| JP | 7-263521 | 10/1995 |
| JP | 07296418 A | 11/1995 |
| JP | 08249802 A | 9/1996 |
| JP | 08273210 | 10/1996 |
| JP | 10228674 A | 8/1998 |
| JP | 11265506 A | 9/1999 |
| JP | 2001232667 | 8/2001 |
| WO | WO 9836867 A1 | 8/1998 |

OTHER PUBLICATIONS

Australian Written Opinion and Search Report, Dec. 17, 2004, Singapore Application No. SG200302857-8.

Mar. 12, 2005 Invitation to Respond to Written Opinion from Intellectual Property Office of Singapore to Tan Jinhwee, Eunice & Lim Chooeng.

"DVD technology"; Tsinberg, M. Eggrs, C.; Image Processing, 1998 ICIP 98 Proceedings. 1998 Int'l Conf on vol. 1; Oct. 4-7, 1998, p. 2: 2 vol. 1.

Pang, S.I. et al., "Effects of Nitrogenated NiP Seedlayer on Co-Alloy Thin Film Media," 1494-96, IEEE Transactions on Magnetics. vol. 37. No. 4 (Jul. 2001)59.

* cited by examiner

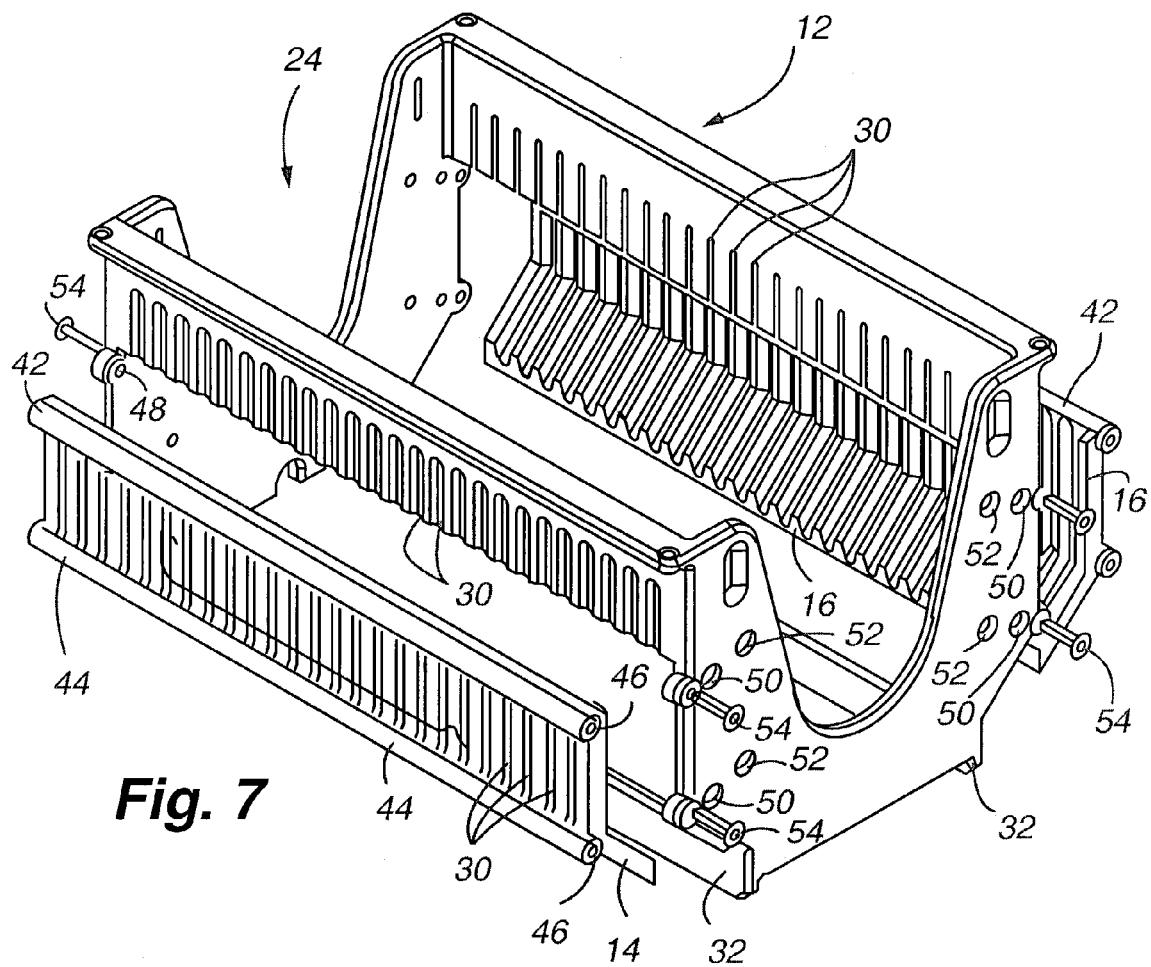

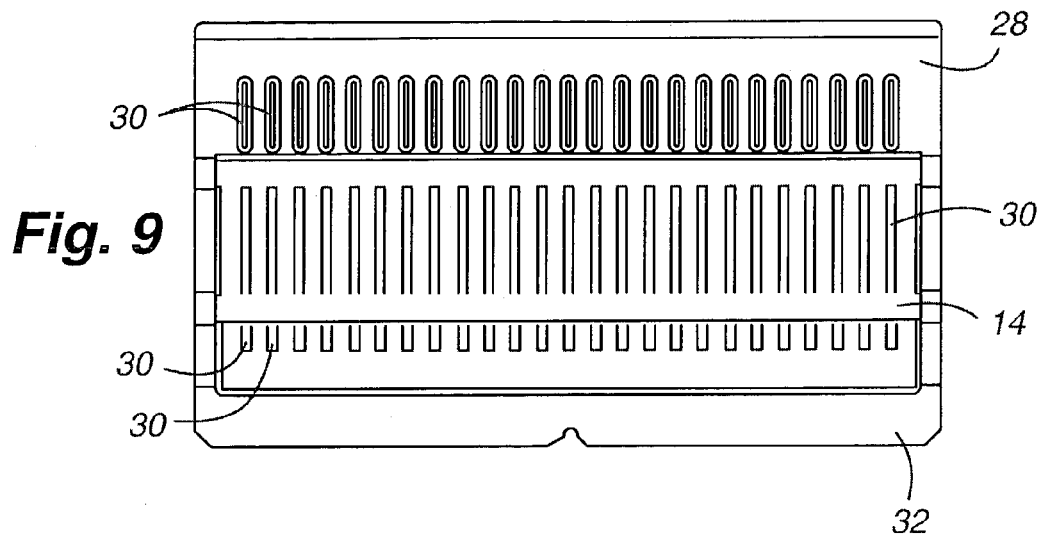
Fig. 9
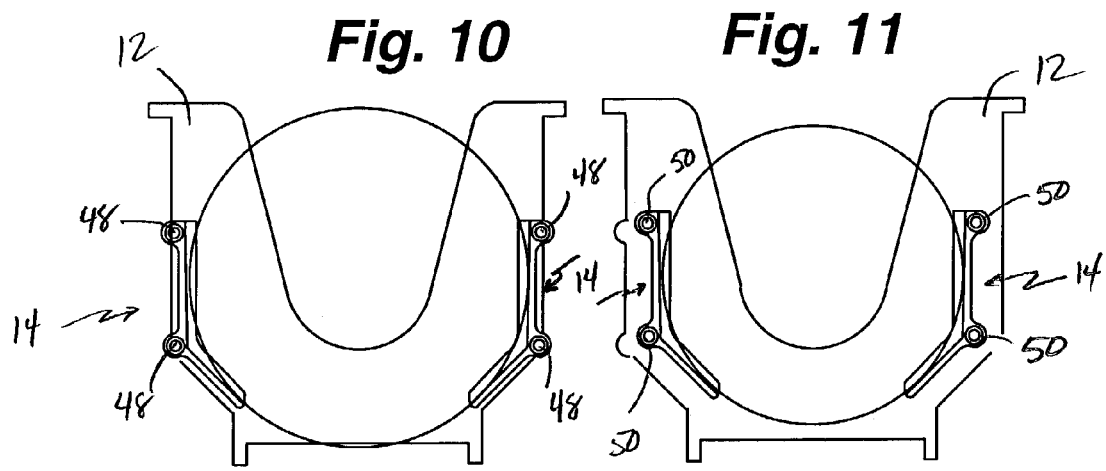
Fig. 10  Fig. 11
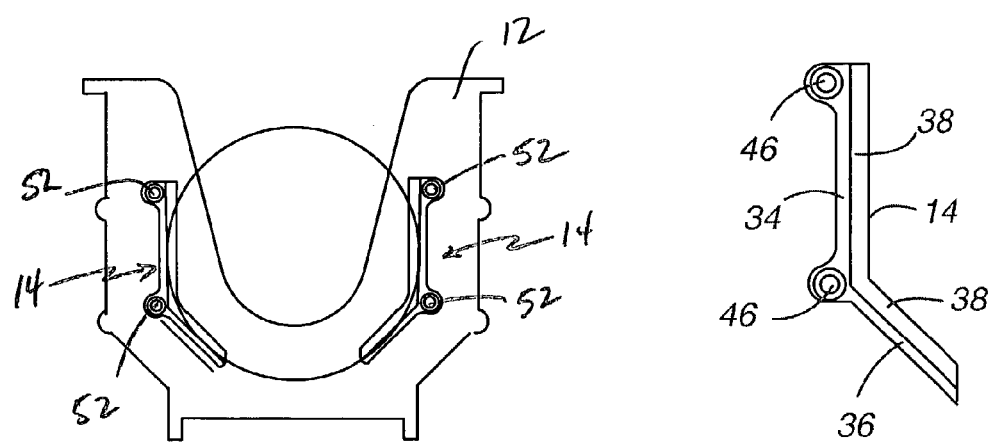
Fig. 12  Fig.13

CASSETTE FOR HOLDING DISKS OF DIFFERENT DIAMETERS

CROSS REFERENCE TO RELATED APPLICATIONS

Priority is claimed from U.S. Provisional Patent Application Ser. No. 60/417,630 filed Oct. 10, 2002, which is incorporated by reference herein in its entirety.

The subject matter of the present application is related to the following applications, each of which has a filing date of May 9, 2003: Ser. No. 10/434,550 entitled Single-Sided Sputtered Magnetic Recording Disks to Clasara et al. (U.S. Pat. No. 7,083,871); Ser. No. 10/435,361 entitled Dual Disk Transport Mechanism Processing Two Disks Tilted Toward Each Other to Grow et al. (U.S. Pat. No. 7,165,308); Ser. No. 10/435,358 entitled Information-Storage Media With Dissimilar Outer Diameter and/or Inner Diameter Chamfer Designs On Two Sides to Clasara et al. (U.S. Pat. No. 7,180,709); Ser. No. 10/435,360 entitled Method of Merging Two Disks Concentrically Without Gap Between Disks to Buitron (U.S. Application No. 2004/0016214); Ser. No. 10/434,551 entitled Apparatus for Combining or Separating Disk Pairs Simultaneously to Buitron et al. (U.S. Pat. No. 7,367,773); Ser. No. 10/435,572 entitled Method of Simultaneous Two-Disk Processing of Single-Sided Magnetic Recording Disks to Buitron et al. (U.S. Pat. No. 7,322,098); Ser. No. 10/435,161 entitled W-Patterned Tools for Transporting/Handling Pairs of Disks to Buitron et al. (U.S. Application No. 2003/0209421); Ser. No. 10/435,295 entitled Method for Servo Pattern Application on Single-Side Processed Disks in a Merged State to Valeri (U.S. Pat. No. 7,027,246); Ser. No. 10/434,547 entitled Method for Simultaneous Two-Disk Texturing to Buitron et al. (U.S. Pat. No. 7,083,502); Ser. No. 10/434,546 entitled Automated Merge Nest for Pairs of Magnetic Storage Disks to Crofton et al. (U.S. Pat. No. 7,083,376); Ser. No. 10/435,293 entitled Apparatus for Simultaneous Two-Disk Scrubbing and Washing to Crofton et al. (U.S. Application No. 2004/0071535); Ser. No. 10/435,362 entitled Cassette Apparatus for Holding 25 Pairs of Disks for Manufacturing Process to Buitron et al. (U.S. Pat. No. 7,168,153); and Ser. No. 10/434,540 entitled Method of Lubricating Multiple Magnetic Storage Disks in Close Proximity to Buitron et al. (U.S. Pat. No. 7,052,739). Each of these applications is incorporated by reference in its entirety as if stated herein.

FIELD

The present embodiments relate to a method and apparatus for handling disks. More specifically, the present embodiments relate to a modular cassette which is changeable to handle different disk form factors.

BACKGROUND

Hard disk drives are an efficient and cost effective solution for data storage. Depending upon the requirements of the particular application, a disk drive may include anywhere from one to multiple hard disks and data may be stored on one or both surfaces of each disk. While hard disk drives are traditionally thought of as a component of a personal computer or as a network server, usage has expanded to include other storage applications such as set top boxes for recording and time shifting of television programs, personal digital assistants, cameras, music players and other consumer electronic devices, each having differing information storage capacity requirements.

Typically, hard memory disks are produced with functional magnetic recording capabilities on both sides or surfaces of the disk. In conventional practice, these hard disks are produced by subjecting both sides of a raw material substrate disk, such as glass, aluminum or some other suitable material, to numerous manufacturing processes. Active materials are deposited on both sides of the substrate disk and both sides of the disk are subject to frill processing such that both sides of the disk may be referred to as active, or in other words, functional, from a memory storage stand point. The end result is that both sides of the finished disk have the necessary materials and characteristics required to effect magnetic recording and provide data storage. These are generally referred to as double-sided process disks. Assuming both surfaces pass certification testing and have no defects, both sides of the disk may be referred to as active, or functional, for memory storage purposes. These disks are referred as double-sided disks. Double-sided disks may be used in a disk drive for double-sided recording.

Conventional double-sided processing of hard memory disks involves a number of discrete steps. For example, twenty-five substrate disks can be placed in a plastic cassette, axially aligned in a single row. Because the disk manufacturing processes are conducted at different locations using different equipment, the cassettes are moved from work station to work station. For most processes, the substrate disks are individually removed from the cassette by automated equipment, both sides or surfaces of each disk are subjected to the particular process, and the processed disk is returned to the cassette. Once each disk has been fully processed and returned to the cassette, the cassette is transferred to the next work station for further processing of the disks.

More particularly, in a conventional double-sided disk manufacturing process, the substrate disks are initially subjected to data zone texturing. Texturing prepares the surfaces of the substrate disks to receive layers of materials which will provide the active or memory storage capabilities on each disk surface. Texturing may typically be accomplished in two ways: fixed abrasive texturing or free abrasive texturing. Fixed abrasive texturing is analogous to sanding, in which a fine grade sand paper or fabric is pressed against both sides of a spinning substrate disk to roughen or texturize both surfaces. Free abrasive texturing involves applying a rough woven fabric against the disk surfaces in the presence of a slurry. The slurry typically contains diamond particles, which perform the texturing, a coolant to reduce heat generated in the texturing process and deionized water as the base solution. Texturing is typically followed by washing to remove particulate generated during texturing. Washing is a multistage process and usually includes scrubbing of the disk surfaces. The textured substrate disks are then subjected to a drying process. Drying is performed on an entire cassette of disks at a time. Following drying, the textured substrate disks are subjected to laser zone texturing. Laser zone texturing does not involve physically contacting and applying pressure against the substrate disk surfaces like data zone texturing. Rather, a laser beam is focused on and interacts with discrete portions of the disk surface, primarily to create an array of bumps for the head and slider assembly to land on and take off from. Laser zone texturing is performed one disk at a time. The disks are then washed again. Following a drying step, the disks are individually subjected to a process which adds layers of material to both surfaces for purposes of creating data storage capabilities. This can be accomplished by sputtering, deposition or by other techniques known to persons of skill in the art. Following the addition of layers of material to each surface, a lubricant layer typically is applied. The lubrication process can be accomplished by subjecting an entire cassette of disks to a liquid lubricant; it does not need to be done one disk at a time. Following lubrication, the disks are individually subjected to surface burnishing to remove asperities, enhance bonding of the lubricant to the disk surface and otherwise provide a generally uniform finish to the disk surface. Following burnishing, the disks are subjected to various types of testing. Examples of testing include glide testing to find and remove disks with asperities that could affect flying at the head/slider assembly and certification testing which is writing to and reading from the disk surfaces. Certification testing is also used to locate and remove disks with defects that make the surface unuseable for data storage. The finished disks can then be subjected to a servo-writing process and placed in disk drives, or placed in disk drives then subjected to servo-writing. The data zone texturing, laser zone texturing, scrubbing, sputtering, burnishing and testing processes are done one disk at a time, with each surface of a single disk being processed simultaneously.

Although the active materials and manufacturing processes, by their nature, are difficult and expensive to employ, over the years, the technology used to manufacture hard memory disks has rapidly progressed. As a result, the density of information that can be stored on a disk surface is remarkable. Indeed, double-sided disks used in personal computers have much greater storage capacity than most consumers require during the useful life of the computer. Consumers thus are forced to pay substantial amounts for excess storage capacity and the components to access the excess storage capacity. This has caused some disk drive manufacturers, in some current applications, to manufacture and sell disk drives which utilize only one side of a double-sided disk for storage purposes or which use the good side of a double-sided process disk where one surface passed certification testing and the second surface failed. In either case, the second surface, despite being fully processed, is unused. However, the disk drive manufacturer reduces its cost by eliminating the mechanical and electrical components needed to access the unused disk surface. These disk drives are referred to as single-side drives and are typically used in low-end or economy disk drives to appeal to the low cost end of the marketplace. Although this approach may reduce some cost, it does not reduce the wasted cost of manufacturing the unused storage surface of each disk. Thus, substantial savings can be achieved by not only manufacturing disks with a single active or functional side, but doing so in a cost-effective manner.

In contrast to a double-sided disk, a single-sided disk has only one functional memory surface with active recording materials. It is not a double-sided process disk where one side is not accessed or where one side has failed testing. Rather, manufacturing processes are applied in a controlled manner only to one side of the disk using unique single-sided processing techniques. In contrast to conventional double-sided disks, active recording materials are only applied to, and full processing is only conducted on, one side of the disk. Thus, substantial savings are achieved by eliminating processing the second side of each disk.

Additionally, the present embodiments achieve advantages by utilizing conventional double-sided disk manufacturing equipment and processes, with limited modification. The present embodiments enable simultaneous processing of two substrate disks through the same equipment and processes used to manufacture double-sided disks. Simultaneously processing two substrate disks results in the production of two single-sided disks in the same time and using essentially the same equipment as currently is used in the production of one double-sided disk. However, each single-sided disk has only a single active or functional surface. For illustrative purposes FIG. 1 shows a side-by-side schematic representation of the processing of one double-sided disk $D_{sub.d}$, depicted on the left side of FIG. 1, versus the simultaneous processing of two single-sided disks $D_{sub.s}$, depicted on the right side of FIG. 1. In each case, the double-sided disk or the two single-sided disks are subjected to the same process steps 1 through N, but the single-sided disk processing produces two disks in the same time the double-sided disk processing produces one disk.

A benefit provided by simultaneous single-sided processing of disks is a substantial cost savings achieved by eliminating the application of materials to and processing of one side of each disk. A further, and potentially significant cost savings can be achieved by utilizing existing double-sided disk processing equipment, with limited modification, to process pairs of single-sided disks. A still further benefit is a substantial increase in production (or reduction in processing time depending upon perspective). By utilizing existing double-sided disk processing equipment, approximately twice the productivity of a conventional double-sided production process is achieved (on the basis of numbers of disks produced) in the production of single-sided disks. Moreover, these increased productivity levels are achieved at approximately the same material cost, excepting the substrate disk, as producing half as many double-sided disks.

The simultaneous processing is achieved by combining two substrate disks together into a substrate disk pair or disk pair. A disk pair is two substrate disks that are oriented in a back-to-back relationship with the back-to-back surfaces either in direct physical contact or closely adjacent with a slight separation. The separation can be achieved with or without an intervening spacer. The substrate disk pair progresses through each process step in much the same way as one double-sided disk, but with only the outwardly facing surface of each disk in the pair being subjected to the full process. Thus, the outwardly facing surface of each pair becomes the active, or functional, surface and the inwardly facing surface of each pair remain inactive, or non-functional.

For convenience and understanding, the following terms will have the definitions set forth:

a) "R-side" and "L-side" refer to the active side and inactive side of a disk, respectively. R-side is the side that does or will have active recording materials and memory capability. The R-side may also be referred to as the active, or functional side. The L-side is the side that has little or no active recording materials or memory capabilities; it is non-functional, or inactive, from a data storage stand point.

b) "Merge" means to bring two disks closer together to form a pair of disks, a disk pair or a substrate pair.

c) "Demerge," conversely, means that a merged pair of disks is separated from each other.

d) "Disk" means a finished memory disk and all predecessor configurations during the manufacturing process starting with a substrate disk and progressing to a finished memory disk, depending upon the context of the sentence in which it is used.

e) "Disk pair" or "substrate pair" means two disks positioned in contact merge, gap merge or spacer merge orientation.

"Double-sided disk" means a single disk which has been subjected to double-sided processing, whether or not both sides of the disk have passed testing or only one side has passed testing.

g) "Gap merge" means a pair of disks that have been merged, but a space is maintained between the two merged disks. One or more spacers may or may not be used to maintain the gap or space. Gap merge includes both concentric and non-concentric merge. It should be understood that there is no precise dimension or limit to the space between the disks that causes them to be gap merged. Gap merge also includes the situation where the gap between the disks gradually decreases from one perimeter edge to the opposite perimeter edge of the disks when the two disks are angled toward each other. An example is when the bottom perimeter edges of the disks are spaced apart and the upper perimeter edges are in contact.

h) "Single-sided disks" means a single disk which has been subjected to single-side processing, where only one surface of the disk is fully processed.

i) "Spacer merge" means a spacer body is used to create spacing between two gap-merged disks.

j) "Contact merge" means a merged pair of disks where the inside surface of each disk is in contact with the inside surface of the other disk. Contact merge includes concentric and non-concentric merge.

k) "Concentric merge" means that two merged disks have the same axis and, assuming the two disks have the same outside diameter and inside diameter (as defined by the center aperture), their outer and inner perimeter edges are aligned.

l) "Concentric contact merge" means a pair of disks that are oriented in both a contact merge and a concentric merge.

m) "Non-concentric merge" or "off-centered merge" means the two merged disks are not concentric to each other or their perimeter edges are not aligned.

n) "Non-concentric contact merge" means the two contact merged disks are not concentric to each other or their perimeter edges are not aligned.

Referring to FIG. 2, a cross-section of a pair of gap-merged disks is shown. The R-side (active or functional side) is the outwardly facing surface R of each disk within the pair. The L-side (inactive or nonfunctional side) is the inwardly facing surface L of each disk within the pair. In comparison, a cross-section of a pair of concentric contact merged disks is shown in FIG. 3. The relative orientation of the R-side and L-side of each disk remains the same, however, the L-side of each disk of the pair are in contact and the outer and inner perimeter P of each disk is aligned with the outer and inner perimeter P of the other disk.

A conventional double-sided disk is shown in FIG. 4. The left side surface is referred to as the "A" side and the right side surface is referred to as the "B" side. Both the A and B sides are subjected to processing, including the addition of active or magnetic materials. In contrast, with reference to FIGS. 2 and 3, the R-side of each disk in a pair of disks is oriented on the outside of the pair and is subjected to processing in the same fashion as the A and B sides of a double-sided disk. Conversely, the L-side of each disk in a pair of disks is oriented on the inside of the pair and is not subjected to full processing in the same fashion as the A and B sides of a double-sided disk.

SUMMARY

The claimed invention contemplates a modular cassette with two primary parts. The first part is a main body and the second part is a pair of side wall inserts. The side wall inserts are those portions of the cassette which contact disks. The inserts may be positioned at different locations relative to the main body to accommodate a range of disk form factors. They are removable from the cassette and adjustable within the cassette. For manufacturability, the inserts are also preferably identical, such that an insert may simply be rotated 180 degrees and attach to the opposite side of the cassette. Preferably, this universal or modular cassette will be made from plastic. A combination of different plastics may be used for different purposes, such as different manufacturing processes in which the cassette is exposed to different environments. Stainless steel rods or other metal reinforcing members may be embedded within the inserts and other component pieces to provide rigidity to the structure to prevent bending, bowing and/or warping. Alternatively, the component pieces can be machined from metal parts. In one embodiment, the modular or universal cassette is configured to handle disk outside diameters ranging from 65 millimeters to 95 millimeters. Similarly, different inserts can be utilized for different disk orientations, such as equally spaced disks, gap merge disks or contact merge disks, simply by replacing or substituting differently configured inserts. Also, the inserts can be configured to hold different numbers of disks within the same cassette main body.

BRIEF DESCRIPTION OF THE DRAWINGS

FIG. 7 is an exploded perspective view of the embodiments of FIG. 5.

FIG. 8 is an exploded end view of the embodiments of FIG. 7.

FIG. 9 is a side elevation view of the embodiments of FIG. 5.

FIG. 10 is a schematic end view of the embodiments of FIG. 5 in a first configuration.

FIG. 11 is a schematic end view of the embodiments of FIG. 5 in a second configuration.

FIG. 12 is a schematic end view of the embodiments of FIG. 5 in a third configuration.

FIG. 13 is an end view of a side wall insert.

It should be understood that the drawings are not necessarily to scale. In certain instances, details which are not necessary for an understanding of the invention or which render other details difficult to perceive may have been omitted. It should be understood, of course, that the claimed invention is not necessarily limited to the particular embodiments illustrated herein.

DETAILED DESCRIPTION

Figure 1:
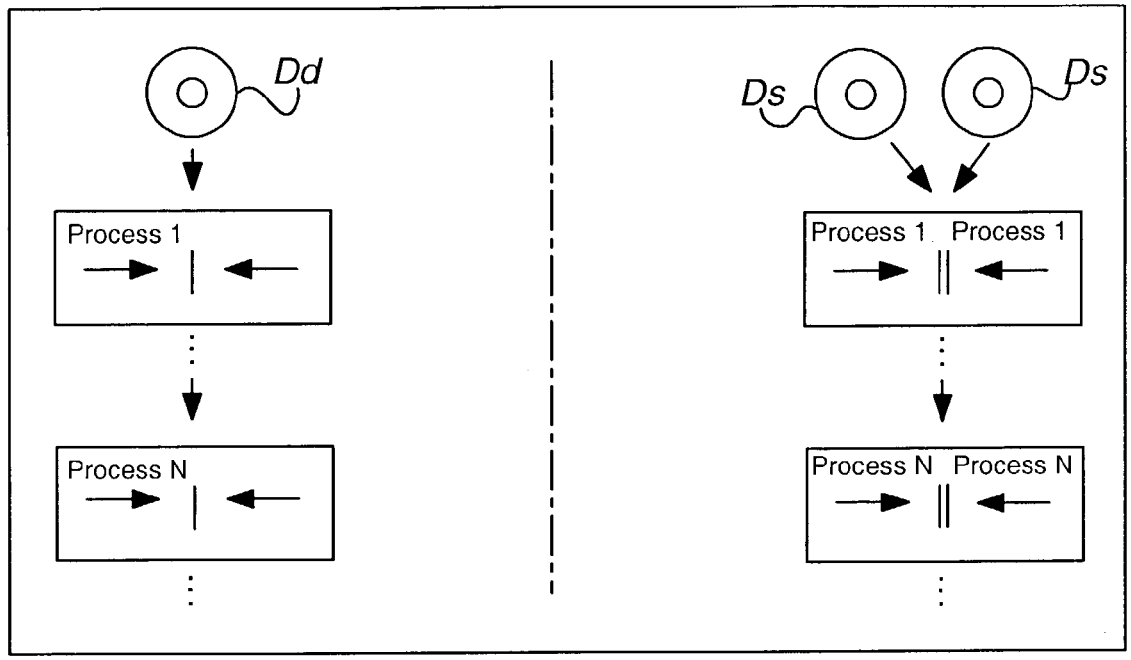
FIG. 1 is a schematic of a double-sided disk manufacturing process, showing process steps 1 through N on the left side of the illustration, and showing a single-sided disk manufacturing process of process steps 1 through N on the right side.
Figure 2:
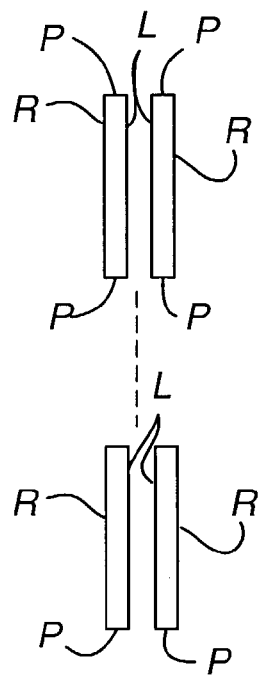
FIG. 2 is a cross-section of a gap merge pair of disks.
Figure 3:
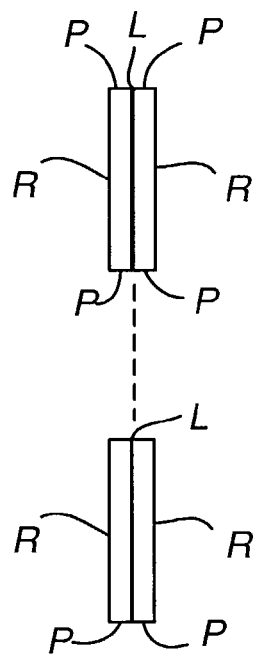
FIG. 3 is a cross-section of a concentric contact merge pair of disks.
Figure 4:
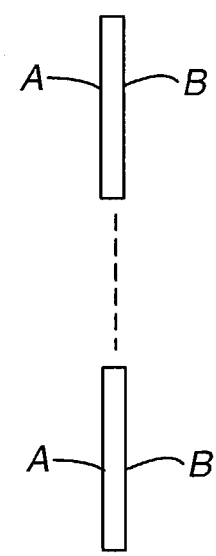
FIG. 4 is a cross-section of a double-sided process disk.
Figure 5:
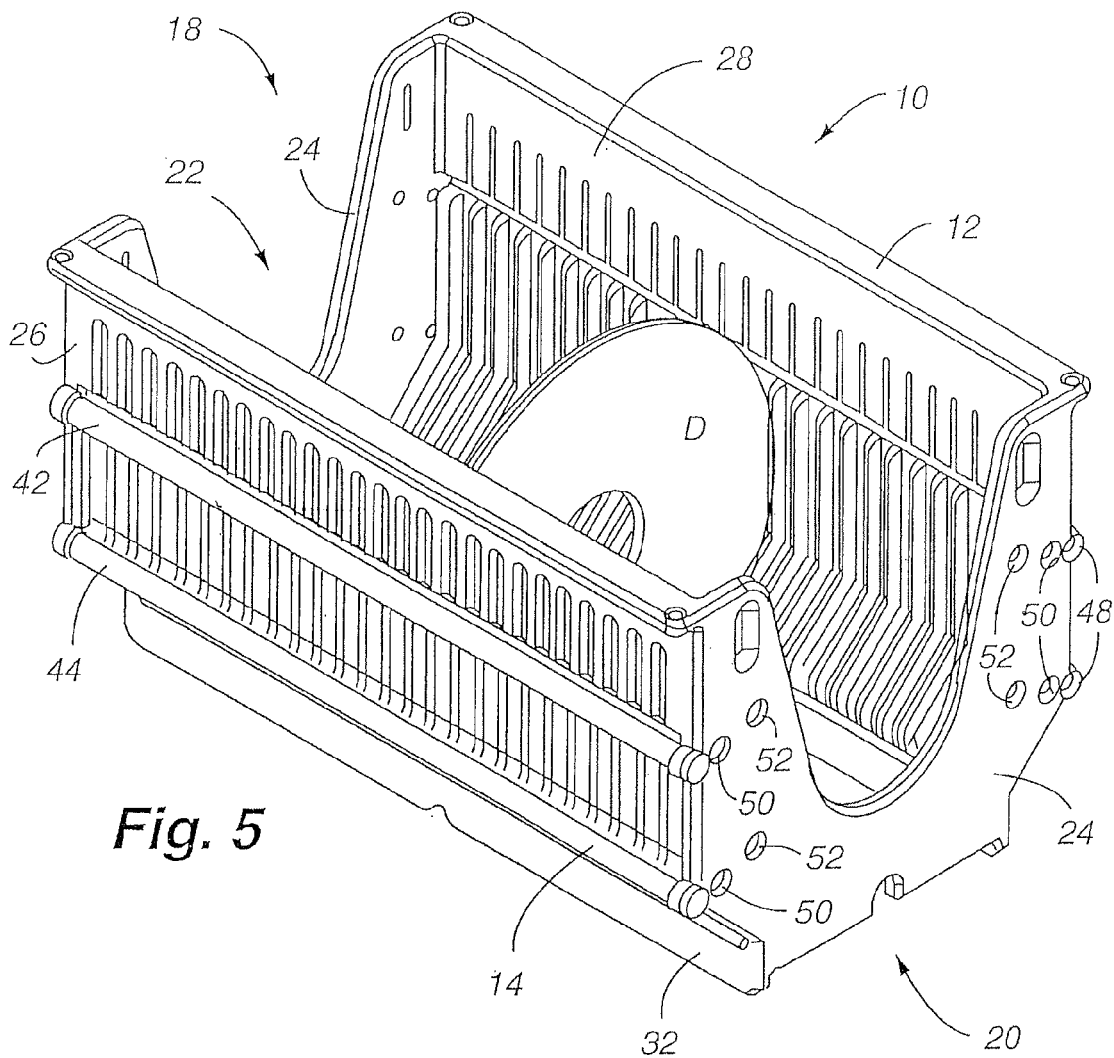
FIG. 5 is a perspective view of embodiments of the modular cassette of the claimed invention.

Turning to FIG. 5, first embodiments of the universal cassette or caddy 10 of the claimed invention are shown. The cassette comprises a main body 12 and a pair of removable or adjustable side wall inserts 14 and 16. The cassette has an open top 18, open bottom 20 and U-shaped openings 22 in the end walls 24. The U-shaped opening allows access to the central aperture of the disks. The open top and open bottom also provide access to the disks. A disk D is shown seated in the cassette. The main body further includes two integral side walls 26, 28 which extend between end walls. A plurality of slots or holes 30 are formed in the integral side walls 26, 28 and in the inserts 14, 16. The slots 30 allow process fluids to be drained from the cassette 10 and disks during processing. While the side walls 26, 28 are illustrated as integrally formed with the end walls 24, they may be separate pieces secured between the end walls. Similarly, a pair of base members 32 extend between the two end walls 24 along the bottom of the cassette 10. The base members 32 also provide rigidity to the cassette 10 and form a support structure upon which the cassette 10 rests (FIG. 8). The base members 32 maybe integrally formed with the end walls 24, or may be formed as separate pieces secured to the end walls 24 through appropriate fasteners.

Figure 6:
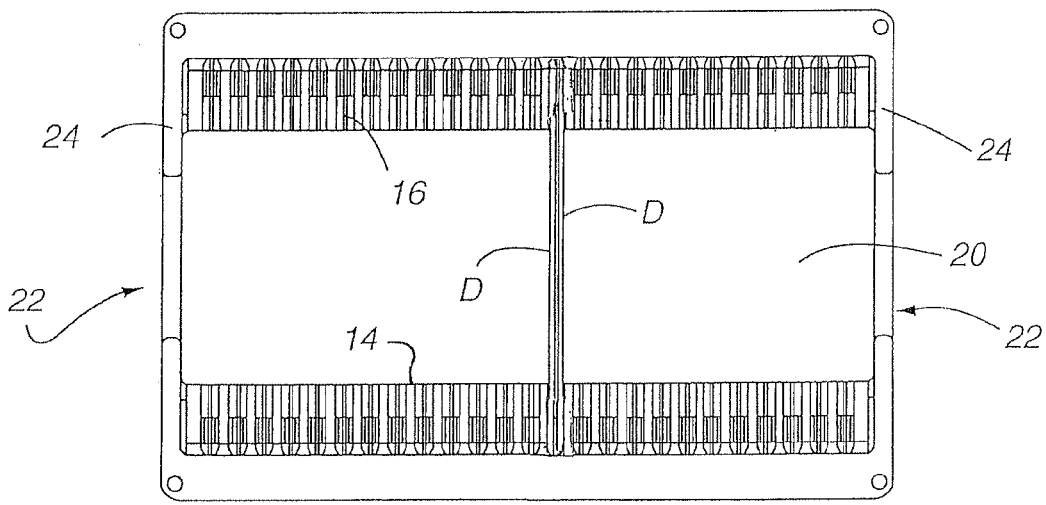
FIG. 6 is a top plan view of the embodiments of FIG. 5.

The side wall inserts 14, 16 are generally shown in FIGS. 5, 7, 8 and 14. In general terms, the inserts 14, 16 preferably comprise a vertical wall portion 34 and a second wall portion 36 forming an obtuse angle with the vertical wall portion 34 and angled inwardly toward the open inside of the cassette 10. The inside surfaces of both the vertical and second wall portions 34, 36, shown in FIGS. 5-7, include a row of ribs 38, which define a row of disk receiving grooves or channels 40. The relative size and spacing of the ribs 38 is determined based upon the form factor of the disk to be utilized. In addition, slots 30 are also formed between the ribs 38, along both the vertical wall portion 34 and second wall portion 36, to allow process fluids to enter into and escape from the cassette 10.

As best shown in FIGS. 5 and 7, horizontal support members 42, 44 extend along the length of each insert 14, 16. The support members 42, 44 provide structural rigidity to the inserts 14, 16 to prevent bending, warpage or breakage. The support members 42, 44 may be hollow, may be solid, or may contain a strengthening rod made of metal or other suitable material for the environment. In addition, each end of the support members 42, 44 is provided with a securement area 46 which correspond to similar securement areas 48, 50 and 52 formed in the end walls 24 of the cassette 10. When aligned, appropriate fasteners 54 can be positioned through securement areas 48, 50 or 52 and into securement area 46 to secure the inserts 14, 16 to the end walls 24 at various positions.

As seen in FIGS. 10-12, the inserts 14, 16 may be secured at various positions relative to the end walls 24 by the predetermined pattern of the securement areas 48, 50, 52 to accommodate disks of different diameter. Thus, inventory issues and cost issues are reduced by allowing a single universal cassette 10 to be utilized which is reconfigurable by repositioning the inserts 14, 16 to accommodate different diameter of disks. For example, using securement areas 48, the inserts 14, 16 are positioned as shown in FIG. 10 to accommodate a large diameter disk. Using securement areas 50, the inserts 14, 16 are positioned as shown in FIG. 11 to accommodate a slightly smaller diameter disk. Using securement areas 52, the inserts 14, 16 are positioned as shown in FIG. 12 to accommodate an even smaller disk. Thus, the cassette 10 as illustrated can be reconfigured to hold disks having at least three different diameters, perhaps 95, 84 and 65 millimeter diameters. It should be appreciated that a cassette 10 may have two or more predetermined positions and is not limited to three predetermined positions.

Figure 14:
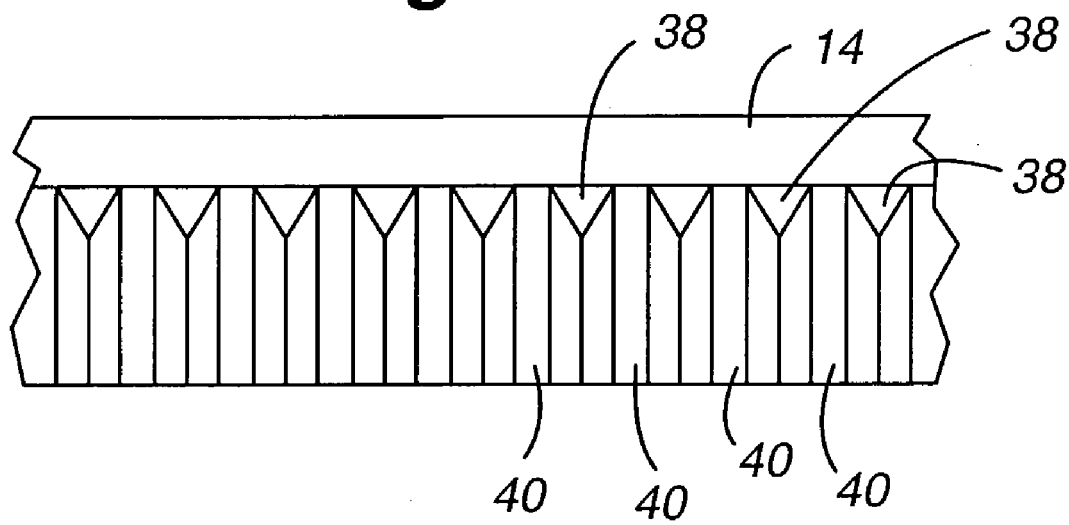
FIG. 14 is a partial top plan view of a side wall insert with ribs configured in a contact merge orientation.
Figure 15:
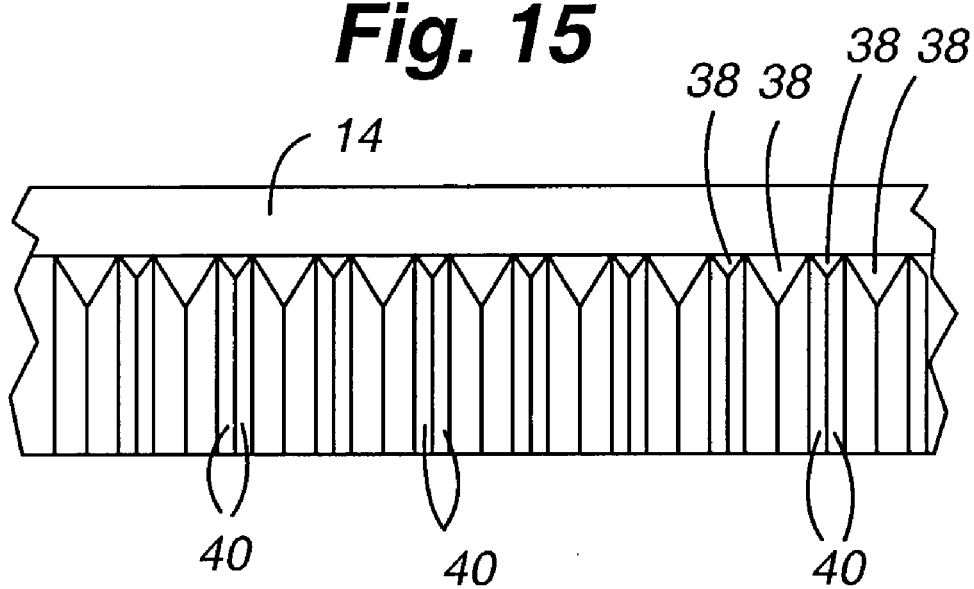
FIG. 15 is a partial top plan view of a side wall insert member with ribs configured in a gap merge orientation.

In addition, and/or alternatively, substituting different inserts 14, 16 having differently configured or sized ribs 38 will allow the cassette 10 to accommodate different thicknesses of disks or to accommodate pairs of disks in different orientations. For example, if the cassette 10 is to be used during processing of single-sided disks, the ribs 38 could be configured as shown in FIG. 14 or 15 to accommodate gap merge disk pairs or contact merge disk pairs, respectively.

For most processing applications, a cassette 10 made from polybutylene terephthalate (PBT) plastic will be satisfactory. However, PBT plastic will not withstand the high temperatures associated with the sputtering process where temperatures can reach 350 degrees Celsius. In high temperature areas like this, polyesteresterketone (PEEK) will provide acceptable results, as will an entirely metal cassette 10. It may also be desirable to utilize an abrasion resistive plastic due to the constant movement of disks into and out of the cassette 10. Such a plastic is PEEK. Alternatively, an abrasion resistive plastic, such as teflon, may be added as an outer layer over a core material, such as stainless steel or aluminum alloys, providing the advantages of each material.

Although the claimed invention has been described with respect to specific embodiments, the details thereof should not be construed as limitations. It will be apparent that various different embodiments, changes and/or modifications may be resorted to without departing from the spirit and scope of the claimed invention. For example, the exact number of securement areas on each end wall may vary. While the drawings illustrate three, there may be as few as two or as many as will fit on the end wall of the cassette. Also, the number of disks within a cassette may vary by varying the exterior size of the cassette. Moreover, as previously noted, it may be desirable in certain circumstances to make the cassette from metal, such as stainless steel or aluminum alloys. Thus, it should be understood that such variations and other equivalent embodiments are intended to be included within the scope of this invention.

The foregoing discussion of the claimed invention has been presented for purposes of illustration and description. The foregoing is not intended to limit the embodiments to the form or forms disclosed herein. In the foregoing Detailed Description for example, various features of the claimed invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of any disclosed embodiment. Thus, the following claims are hereby incorporated into this Detailed Description, with each claim standing on its own as separate embodiments of the invention.

Moreover, though the description of the claimed invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for changing a disk carrier to accommodate disks of different diameters, comprising:
    obtaining a disk carrier body portion having two opposed end walls each defining a first securement area corresponding to a first disk diameter and a second securement area different than the first securement area and corresponding to a second disk diameter;

obtaining a pair of side wall inserts;

aligning the side wall inserts to the opposed end walls at a selected one of the first and second securement apertures to accommodate the corresponding disk diameter; and removably fastening the side wall inserts to the end walls via the selected securement areas.

2. The method of claim 1, further comprising aligning the side wall inserts to the second securement areas to accommodate disks of the second diameter.

3. The method of claim 2, where the second diameter is less than 95 millimeters.

4. The method of claim 1, where the first diameter is approximately 95 millimeters.

5. A disk carrier for accommodating disks of different diameters, comprising:

opposing lateral end walls;

opposing longitudinal side walls, each fixedly connected at proximal and distal ends to the lateral end walls and disposed therebetween to define a fixed-size passage for passing a disk therethrough into the carrier;

a longitudinal support member selectively positionable at a plurality of different lateral positions and operably attached to the lateral end walls at a selected lateral position of the via a removable fastener plurality of different lateral positions;

a side wall insert extending from the longitudinal support member and defining a disk supporting surface, that is operably configured to support a disk of a selected diameter at the corresponding lateral position of the longitudinal support member, the side wall insert having a lateral dimension corresponding to a disk diameter that is determined in relation to the selected lateral position of the longitudinal support member.

6. The disk carrier of claim 5 wherein the disk supporting surface supportingly engages a pair of adjacent disks in a gap merge orientation.

7. The disk carrier of claim 5 wherein the disk supporting surface supportingly engages a pair of adjacent disks in a contact merge orientation.

8. The disk carrier of claim 5 comprising a pair of longitudinal support members, at least one of the pair being adjustably connectable to at least one of the lateral end walls, and both of the pair being operably disposed between the lateral end walls to selectively position opposing disk supporting surfaces at a desired spacing from each other adjacent to the fixed-size passage.

9. The disk carrier of claim 5 wherein the side wall insert defines a disk supporting surface for each of a plurality of disks, and wherein the side wall insert defines an opening between adjacent disk supporting surfaces through which a fluid that enters the disk carrier can drain out of the disk carrier.

10. The disk carrier of claim 5 wherein at least one of the lateral end walls defines a first securement area and a second securement area, and wherein the longitudinal support member defines a third securement area that is alternatively alignable with either the first or second securement area.

11. The disk carrier of claim 10 wherein the at least one of the lateral end walls and the longitudinal support member are operably connected with removable fasteners engaging the aligned securement area.

12. A disk carrier for accommodating disks of different sizes, comprising:

opposing end walls connected to opposing base members forming a substantially rectangular body with a passage, at least one of the end walls defining a first securement area and a second securement area;

a side wall insert defining a disk supporting surface and a third securement area, the side wall insert being selectively moveable to operably align the first securement area with the third securement area to dispose the disk supporting surface at a first selected position with respect to the passage, and the side wall insert being alternatively moveable to operably align the second securement area with the third securement area to dispose the disk supporting surface at a second selected position different than the first selected position with respect to the passage; and a removable fastener admitted to at least one of the operably aligned securement areas to join the side wall insert to the respective end wall.

13. The disk carrier of claim 12 comprising a pair of opposing side wall inserts being selectively moveable to dispose respective opposing disk supporting surfaces at a selected spacing of different spacings corresponding to the disks of different sizes.

14. The disk carrier of claim 12 wherein the at least one of the end walls defines a first pair of securement areas and a second pair of securement areas, wherein the side wall insert defines a third pair of securement areas, wherein the side wall insert is selectively moveable to operably align the first pair of securement areas with the third pair of securement areas to admit a pair of removable fasteners to join the side wall insert to the at least one of the end walls so as to dispose the disk supporting surface at the first selected position, and wherein the side wall insert is alternatively moveable to operably align the second pair of securement areas with the third pair of securement areas to admit the pair of removable fasteners to join the side wall insert to the at least one of the end walls so as to dispose the disk supporting surface at the second selected position.

15. The disk carrier of claim 12 wherein the at least one of the securement areas comprises an aperture.

16. A disk carrier for accommodating disks of different sizes, comprising:

opposing lateral end walls connected to opposing longitudinal side walls forming a substantially rectangular body; and a longitudinal side wall insert defining a disk supporting surface that operably supports the disks, the side wall insert being selectively positionable at a plurality of different lateral positions and operably attached to the lateral end walls at a selected lateral position of the plurality of different lateral positions via a removable fastener.

17. The disk carrier of claim 16 wherein the disk supporting surface contactingly engages a pair of adjacent disks in a gap merge orientation.

18. The disk carrier of claim 16 wherein the disk supporting surface contactingly engages a pair of adjacent disks in a contact merge orientation.

19. The disk carrier of claim 16 comprising a pair of longitudinal side wall inserts, at least one of the pair being adjustably connectable to at least one of the lateral end walls, and both of the pair being operably disposed between the lateral end walls to selectively position opposing disk supporting surfaces at a desired spacing from each other.

20. The disk carrier of claim 16 wherein the longitudinal side wall insert defines a disk supporting surface for each of a plurality of disks, and wherein the longitudinal side wall insert defines an opening between adjacent disk supporting surfaces through which a fluid that enters the disk carrier can drain out of the disk carrier.

21. The disk carrier of claim 16 wherein the at least one of the lateral end walls defines a first securement area and a second securement area, and wherein the longitudinal side wall insert defines a third securement area that is alternatively alignable with either the first or second securement area.

22. The disk carrier of claim 21 wherein the at least one of the lateral end walls and the longitudinal side wall insert are operably connected with removable fasteners engaging the securement areas.

23. A disk carrier for accommodating disks of different diameters, comprising:
   opposing end walls operably connected to opposing side walls forming a substantially rectangular body defining a passage for operably inserting the disks into the disk carrier; and
   adjustable means located in the end walls for selectively adjusting the operable spatial separation of opposing side wall inserts in relation to the diameter of a selected disk in order to operably support the selected disk in the disk carrier.

* * * * *